United States Patent
Wadey et al.

(10) Patent No.: US 9,663,173 B2
(45) Date of Patent: May 30, 2017

(54) MOUNTING DEVICE FOR ONE OR MORE ACCESSORIES AND METHOD OF USING SAME

(71) Applicants: Brian Wadey, Sumner, WA (US);
Marcos Oquendo, Miami, FL (US)

(72) Inventors: Brian Wadey, Sumner, WA (US);
Marcos Oquendo, Miami, FL (US)

(*) Notice: Subject to any disclaimer, the term of this patent is extended or adjusted under 35 U.S.C. 154(b) by 14 days.

(21) Appl. No.: 14/823,065

(22) Filed: Aug. 11, 2015

(65) Prior Publication Data
US 2016/0052464 A1    Feb. 25, 2016

Related U.S. Application Data

(60) Provisional application No. 62/038,896, filed on Aug. 19, 2014.

(51) Int. Cl.
*B62J 11/00* (2006.01)
*B62J 7/06* (2006.01)
*B60R 11/04* (2006.01)
*B62J 99/00* (2009.01)

(52) U.S. Cl.
CPC ............. *B62J 11/00* (2013.01); *B60R 11/04* (2013.01); *B62J 7/06* (2013.01); *B62J 2099/0033* (2013.01)

(58) Field of Classification Search
CPC ..... B60R 11/00; B60R 11/04; B60R 11/0211; B60R 11/0241; B60R 11/0258; B62J 11/00; B62J 11/06; B62J 2099/0033
USPC ....... 224/420, 441, 448, 452, 453, 546, 564, 224/181, 413, 929; 396/422, 419; D12/114
See application file for complete search history.

(56) References Cited

U.S. PATENT DOCUMENTS

| | | |
|---|---|---|
| D88,229 S | 11/1932 | Hamm |
| D224,085 S | 7/1972 | Cuva |
| 4,473,177 A | 9/1984 | Parandes |
| D318,607 S | 7/1991 | Reid et al. |
| 5,260,731 A | 11/1993 | Baker |
| 5,355,746 A | 10/1994 | Lin |

(Continued)

FOREIGN PATENT DOCUMENTS

| | | | |
|---|---|---|---|
| DE | 102011055483 | 5/2013 | |
| DE | 202013104557 U1 * | 12/2013 | ............. B62J 29/00 |
| FR | 2868034 | 3/2004 | |

OTHER PUBLICATIONS

International Search Report and Written Opinion in PCT Application No. PCT/US2014/0022487, Jul. 28, 2014.

(Continued)

*Primary Examiner* — Justin Larson
(74) *Attorney, Agent, or Firm* — Mark T. Vogelbacker; Reed Smith LLP

(57) ABSTRACT

A device for removably mounting an accessory to a vehicle can include a mount configured to engage at least a portion of the vehicle. A base can be fixedly attached to at least a portion of the mount. A top can be rotatably attached to at least a portion of the base. At least a portion of the top can be attachable to at least a portion of the accessory. A gasket can be positioned between the base and the top. At least one fastener can extend through at least a portion the top, through the base and into at least a portion of the mount. The fastener can be configured to restrict movement of the top, the base and the mount along at least one axis.

20 Claims, 20 Drawing Sheets

(56) References Cited

U.S. PATENT DOCUMENTS

| | | |
|---|---|---|
| D370,193 S | 5/1996 | Shull |
| D374,167 S | 10/1996 | Scholl |
| 6,062,053 A * | 5/2000 | Ho .................. B62J 9/003 224/417 |
| D433,616 S | 11/2000 | Fischer |
| 6,484,913 B1 * | 11/2002 | Hancock ............... B60R 7/14 211/64 |
| 6,522,748 B1 * | 2/2003 | Wang ................. B60R 11/02 379/446 |
| D544,565 S | 6/2007 | Campbell |
| D556,017 S | 11/2007 | Hutter, III |
| D569,713 S | 5/2008 | Sandidge |
| D594,739 S | 6/2009 | Lee |
| D596,577 S | 7/2009 | Asano et al. |
| D605,127 S | 12/2009 | Yasuda et al. |
| D618,085 S | 6/2010 | Lin et al. |
| D658,486 S | 5/2012 | Hecht et al. |
| D666,473 S | 9/2012 | Despotellis |
| D666,895 S | 9/2012 | Despotellis |
| 8,267,418 B1 | 9/2012 | Chuang |
| D691,461 S | 10/2013 | Waugh et al. |
| D698,377 S | 1/2014 | McGaughy |
| 8,708,205 B2 | 4/2014 | Wotton |
| D705,168 S | 5/2014 | Yamauchi et al. |
| 8,757,460 B1 | 6/2014 | Barnes |
| 8,770,608 B1 | 7/2014 | Chamberlain |
| D717,157 S | 11/2014 | Widdows et al. |
| D722,567 S | 2/2015 | Lee et al. |
| 2001/0039850 A1 | 11/2001 | Masui |
| 2008/0283704 A1 | 11/2008 | Hsu |
| 2010/0171832 A1 | 7/2010 | Solida |
| 2010/0214793 A1 | 8/2010 | Retief |
| 2010/0264184 A1 | 10/2010 | Retief |
| 2011/0221161 A1 | 9/2011 | Ludovici et al. |
| 2012/0091179 A1 | 4/2012 | Wolton |
| 2014/0056127 A1 | 2/2014 | Tate |
| 2014/0263509 A1 | 9/2014 | OQuendo et al. |

OTHER PUBLICATIONS

Feisol. Feisol Bicycle Mount Jan. 10, 2013. [Retrieved on Jun. 20, 2014]. Retrieved from Internet: <https://web.archive.org/web/20130110033957/http://www.feisoleurope.com/feisol-bycycle-mount-p-84.html>. Entire Document.

Notice of Allowance in U.S. Appl. No. 14/202,340, dated Jun. 30, 2015.

\* cited by examiner

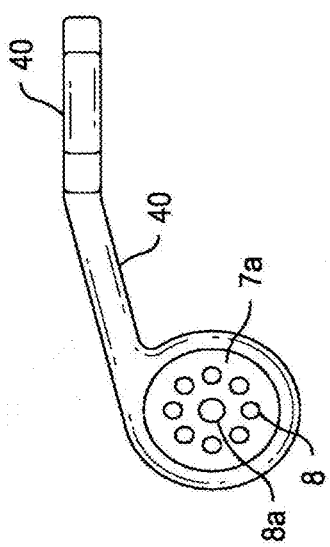
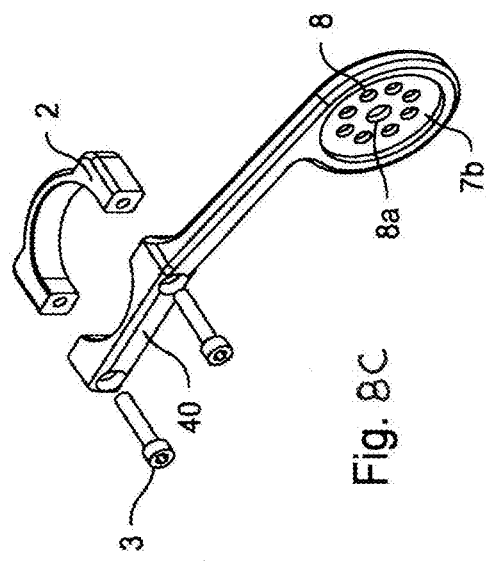
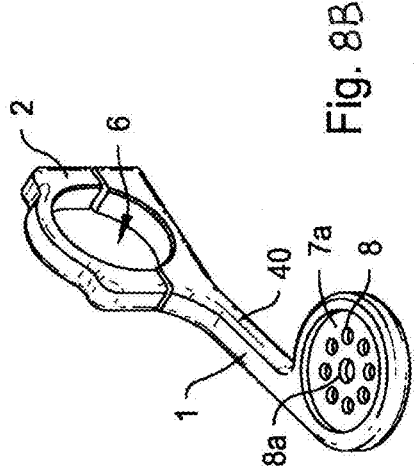
Fig. 8A
Fig. 8B
Fig. 8C

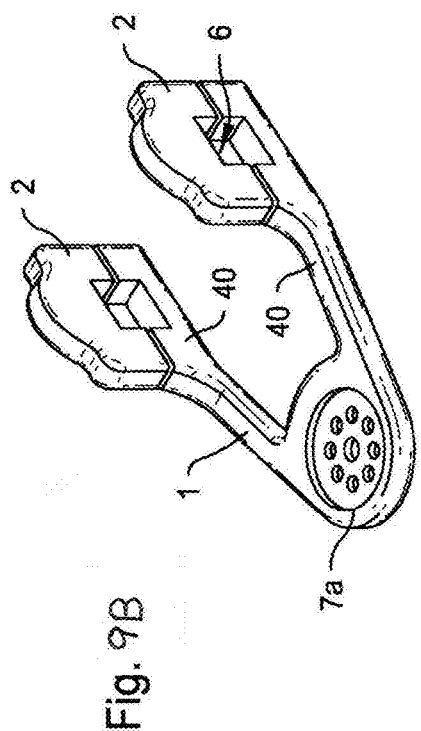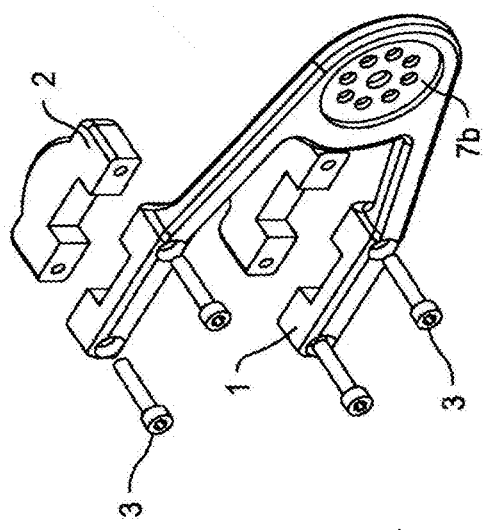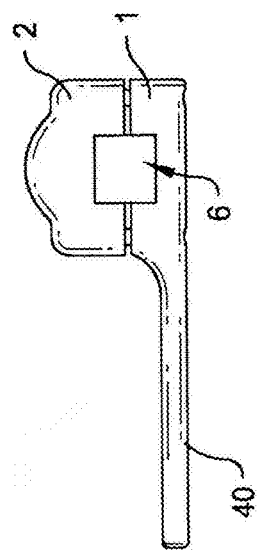

MOUNTING DEVICE FOR ONE OR MORE ACCESSORIES AND METHOD OF USING SAME

CROSS-REFERENCE TO RELATED APPLICATION

The present application claims priority to U.S. Provisional Patent Application No. 62/038,896, filed Aug. 19, 2014 and entitled "Mounting Device for One or More Accessories and Method of Using Same," the disclosure of which is hereby incorporated by reference in its entirety.

BRIEF SUMMARY

The present disclosure relates generally to a mounting device and, more particularly, to an apparatus for and method of mounting one or more accessories to a location and/or an object, such as a motorized or non-motorized vehicle.

Portable devices, such as mobile phones and cameras, have become increasingly relied upon by individuals on a daily basis. Such devices or accessories are typically designed for ease of portability, and can often be stored in a pocket or bag of the user. Users often wish to temporarily or permanently mount such portable devices on a wide range of locations and/or equipment, such as a bicycle.

Since technology constantly evolves, portable devices of new and altered designs are frequently introduced into the market. Such state-of-the-art devices typically have new and/or unique mounting mechanisms. Accordingly, users wishing to adopt such new portable devices typically are required to comply with the device's mechanism(s) and/or unique structure for affixing the device to a particular location or equipment. Often, this requires that the user purchase and install new mounts to the desired location and/or equipment.

Conventional mounting mechanisms are typically stationary or may have limited maneuverability or adjustability. For example, no known prior art mechanism can freely or easily swivel or rotate over a span of three hundred sixty degrees. Such limited functionality can be frustrating to users, who prefer to have full control over the positions of their portable devices.

The devices of the present application provide a more robust, more versatile, and more adaptable system for mounting portable devices to various types of locations and/or equipment. The devices of the present application provide a mounting system that can quickly be adapted to suit the mounting requirements of currently available and new portable devices without a large-out-of-pocket expense to the user. In addition to other features and capabilities, the devices of the present application can freely or easily swivel or rotate, about three axes, over a span of three hundred sixty degrees.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 8A is a top elevation view of a chassis and other components of a universal mounting device according to another embodiment of the present disclosure;

FIG. 8B is a front perspective view thereof;

FIG. 8C is a partially exploded bottom perspective view thereof;

FIG. 9A is a side elevation view of a chassis and other components of a universal mounting device according to another embodiment of the present disclosure;

FIG. 9B is a front perspective view thereof;

FIG. 9C is a partially exploded bottom perspective view thereof;

DETAILED DESCRIPTION

Figure 1:
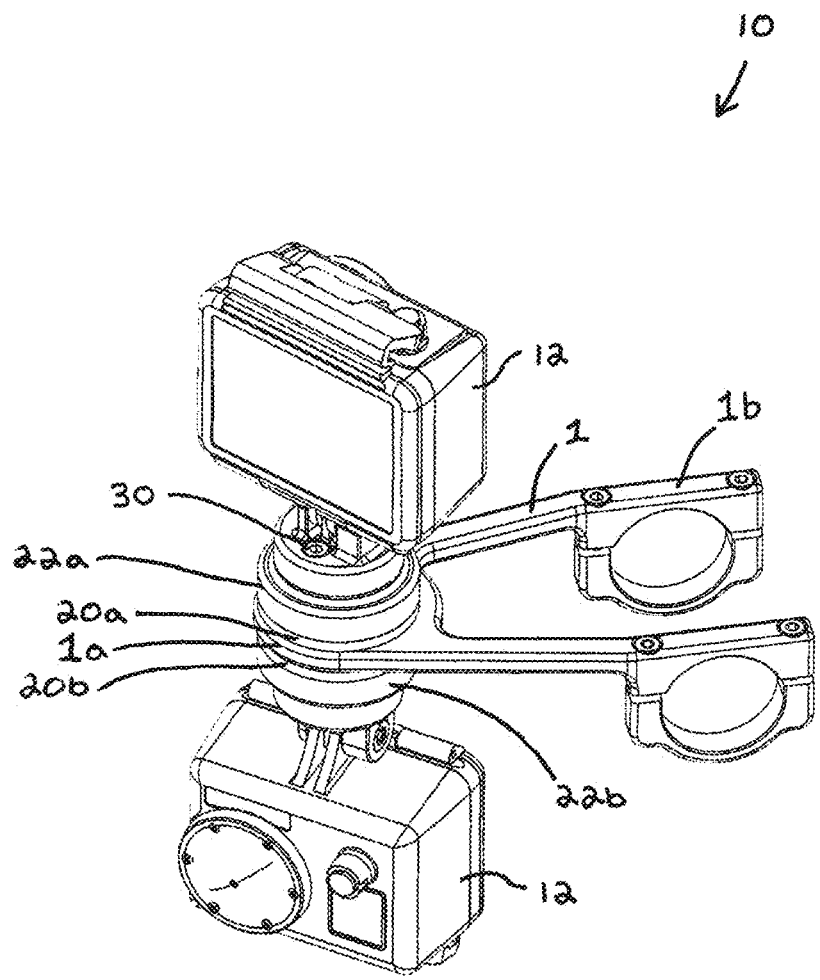
FIG. 1 is a perspective view of a universal mounting device, according to an embodiment of the present disclosure, with top and bottom accessories.

Certain terminology is used in the following description for convenience only and is not limiting. The words "lower," "bottom," "top" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Referring to the drawings in detail, wherein like reference numerals indicate like elements throughout, FIGS. 1-12 illustrate a universal mounting device, generally designated 10, according to an embodiment of the present disclosure. The device 10 can removably or permanently attach one or more accessories 12 (see FIGS. 1-4 and 10-12) to a location and/or an object 14 (see FIG. 12). The device 10 can removably or permanently attach one accessory 12 in either one of two attachment locations (i.e., top and bottom), or the device 10 removably or permanently attach two accessories 12 in both attachment locations concurrently.

The accessory 12 can be any of a variety of different devices, such as one or more of a mobile or cellular phone, a carrier, cradle or cover for same (see FIG. 2), a computer tablet, a personal digital assistant ("PDA"), a Mpeg-1 audio layer 3 ("MP3") player, a camera, a camcorder, a flashlight, a navigation or global positioning satellite ("GPS") unit, a gaming unit, and the like. The object 14 can be a bicycle (see FIGS. 8-10), a scooter, a tricycle, a stroller, a golf cart, a shopping cart, a boat, an all-terrain vehicle ("ATV"), a snowmobile, a personal watercraft, a motorcycle, a recreational vehicle ("RV"), a personal mobility or transportation device (e.g., a SEGWAY® or a wheelchair), a shopping cart, a car, a train, a bus, a personal protection device (e.g., a helmet), a forklift, an aircraft, an industrial truck, a point of sale apparatus or cash register, an unmanned aerial vehicle ("UAV"), a tree stand, a canoe, a kayak, a trike, a fishing pole, and the like, while the location can be a wall, a ceiling, a bannister, a railing, a pole, a tri-pod, an A-frame, or the like.

The device 10 can be a single, dual or multiple contact mount that includes a generally elongated frame or chassis 1. The device 10 is not limited to a single or dual contact points. The chassis 1 and one or more of the components described below can be composed or formed of a metallic material, such as aluminum or an alloy thereof. The aluminum can be an aircraft grade material such as Aluminum 6061 to provide rigidity for the device 10. However, the device 10 is not limited to any material, and those skilled in the art will understand that other metal and non-metal materials, such as carbon fiber, graphite, steel, a polymeric material and the like, are suitable for use in the device 10. In certain embodiments, an anodized finish can be applied to the device 10. However, other finishing processes or no finish can be applied.

At least one or more separate and spaced-apart chassis caps 2 can removably or permanently attach to at least a portion of the chassis 1. Each chassis cap 2 can be coupled to the chassis 1 by at least one or more fastening mechanisms, mounting hardware or fasteners 3, such as a screw or bolt. The mounting hardware 3 can be head cap screws, or the like. The head cap screws can be M4×0.7" attaching hardware.

Figure 5A:
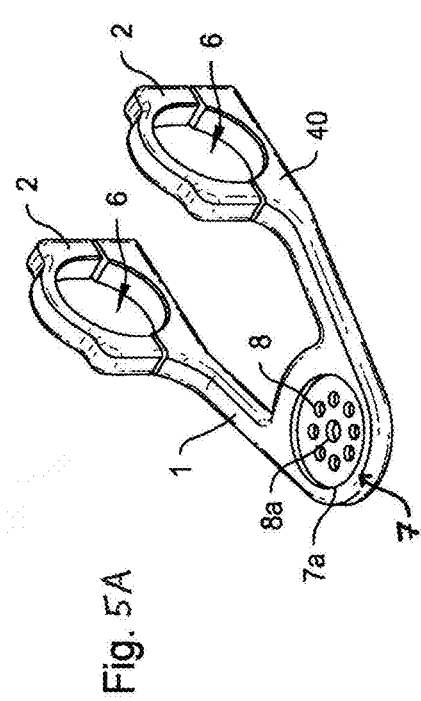
FIG. 5A is an inverted, front perspective view of a chassis and other components of the device shown in FIGS. 1-4.
Figure 5B:
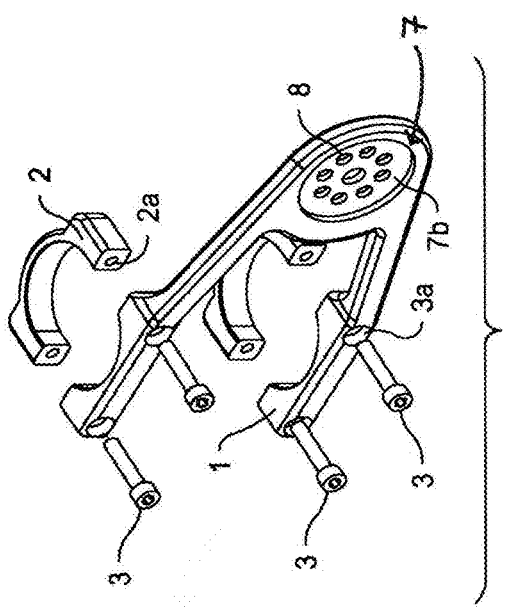
FIG. 5B is an inverted, partially exploded perspective view of the chassis and other components of the device.

The chassis caps 2 can be at least substantially equal or identical in size, shape and/or configuration. As shown in FIGS. 5B and 8C, an inner or bottom surface of each chassis cap 2 can be concave and/or define a semi-circular area. The chassis caps 2 can be machined to at least reduce or eliminate sharp edges by applying a radius/edge break on all outer periphery surfaces. The radius/edge break can be approximately 0.062. As shown in FIGS. 5B, 8C and 9C, to attach one of the chassis caps 2 to the chassis 1, the mounting hardware 3 can be inserted at least generally, if not exactly, perpendicularly to a bottom surface of the chassis 1, through threaded (or non-threaded) holes 3a in the chassis 1, and into threaded bore holes 2a in the chassis cap 2. The threading of the bore holes 2a can be a M4×0.7 thread specification. Alternatively, each chassis cap 2 can be pivotably attached to a portion of the chassis 1, or only a portion of each chassis cap 2 can be removably attachable to the chassis 1, while another portion of each chassis cap 2 can be fixedly attached and/or integrally formed with the chassis 1.

Figure 12:
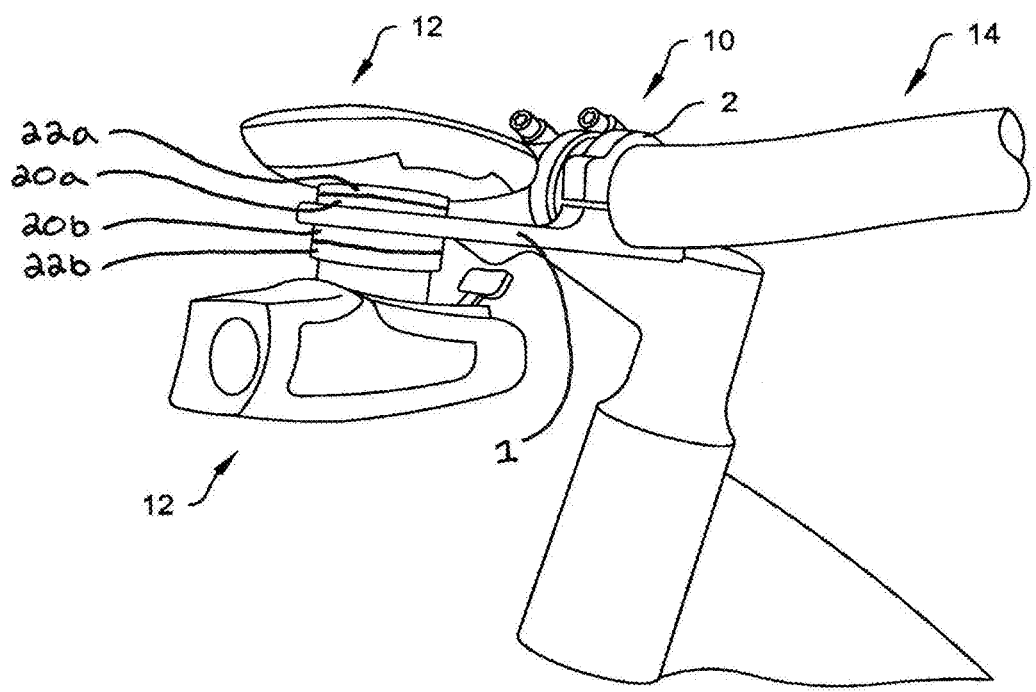
FIG. 12 is a front perspective schematic diagram of the device shown in FIG. 1 attaching two accessories to handlebars of a bicycle.

When properly attached or "closed" (see FIG. 5A), at least a portion of the chassis 1 and a bottom surface of the chassis cap(s) 2 can define a hollow, generally rounded attachment area or passageway 6 for mounting the device 10 to a location and/or a portion of the object 14, such as onto the handlebars of a bicycle (see FIG. 12). Various configurations, sizes, and/or shapes for the attachment area(s) 6 can be created by varying the size of the chassis 1 and the chassis cap(s) 2. For example, each attachment area 6 can have a generally square (see FIGS. 9A-9C), triangular or rectangular cross-sectional shape. As shown in FIG. 5A, the device 10 can have two spaced-apart and aligned attachment areas 6, which allows a handlebar or other similarly shaped structure to easily pass therethrough while providing stability to the device 10 when mounted to a bicycle 14, for example. At least three different sizes of the attachment area(s) 6 can be provided to adapt to specific tubing size (22.2 mm, 25.4 mm and 31.8 mm). Furthermore, other attaching/mounting solutions can be utilized instead or in place of the attachment area(s) 6, including, but not limited to, flush mount, magnetic mount, and Quick Release Pin Mount.

A first end 1a of the chassis 1, which is generally opposite a second end 1b including the chassis caps 2, can be at least generally rounded and can include an accessory interface 7. The accessory interface 7 can include a first portion or top surface 7a (see FIG. 5A) and an opposing second portion or bottom surface 7b (see FIG. 5B). Although one or more of the accessories 12 can be mounted directly to either of the first and second portions 7a, 7b, one or more additional components can directly attach to either of the first and second portions 7a, 7b, which in turn directly attached to one or more of the accessories 12.

Referring to FIGS. 5A and 5B, the accessory interface 7 can include a plurality of spaced-apart through holes 8 arranged in a circular pattern around a center hole 8a. The through holes 8 and/or the center hole 8a can pass transversely through the chassis 1 from the top surface 7a to the bottom interface 7b. Each through hole 8 and the center hole 8a can have threaded or smooth interiors, and can be sized and/or shape to allow at least a portion of one or more mounting hardware or fasteners 26, 30 (described below) to pass therethrough and/or engage at least a portion thereof.

The second end 1b of the chassis 1 can include or be attached to two spaced-apart arms or legs 40. Each leg 40 can extend between from the first end 1a to the second end 1b of the chassis 1. As shown in FIG. 1, at least a portion of the legs 40 can extend generally parallel to one another. Alternatively or additionally, the legs 40, or at least a portion thereof, can extend at an angle of greater than zero degrees (0°) and less than ninety degrees (90°) with respect to one another. For example, the legs 40 can extend at an angle of approximately thirty degrees (30°) from one another. The legs 40 can have substantially or exactly the same length. The device 10 is not limited to any particular number of legs 40, and can have only one leg 40 (see FIG. 8A-8C), or more than two legs 40 in order to provide additional support contact points. Referring to FIGS. 5B and 8C, at least a portion of a top surface of each leg 40 can define an arcuate or concave surface having a first radius. At least a portion of the top surface of each leg 40 is configured to couple with the arcuate bottom surface of one of the chassis caps 2 to define the passageway 6.

The chassis 1 can be manufactured as a single, unitary and continuous body, and can be constructed to eliminate sharp edges. The chassis 1 can be machined by applying a radius/edge break of approximately 0.062 on all outer periphery surfaces. The outer periphery of the chassis 1 can be minimized to reduce natural atmospheric resistance. The chassis 1 of the device 10 can be modified/enhanced to aid in the performance by including additional "lightening" holes and/or modifying the edge radii. Furthermore, the overall current size (e.g., length, width and height) and shape of the components of the device 10 when assembled can be modified as necessary.

Figure 6:
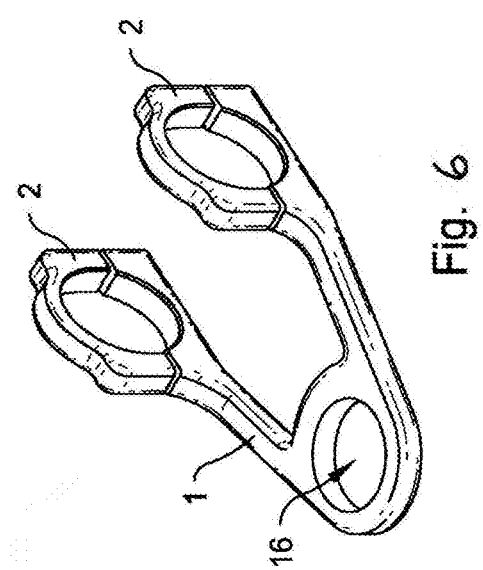
FIG. 6 is an inverted, front perspective view of a chassis and other components of a universal mounting device according to another embodiment of the present disclosure.

In one embodiment, the chassis cap(s) 2 can be omitted, such that the chassis 1 can directly attach to the location and/or object 14. At least a portion of one of the mounting hardware 3 can be inserted into one of the threaded holes 1a in the chassis 1 and into the location and/or object 14. The location and/or object 14 can include one or more preformed holes (not shown) for receiving at least a portion of one or more of the mounting hardware 3. In addition, as shown in FIG. 6, the top and bottom surfaces 7a, 7b of the accessory interface 7 can be omitted, such that a passageway 16 extends completely through the chassis 1. The passageway 16 can be at least generally, if not exactly, circular when viewed from above and below. The passageway 16 can have a smooth interior peripheral surface, or the passageway 16 can have one or more screw threads, for example.

Figure 7A:
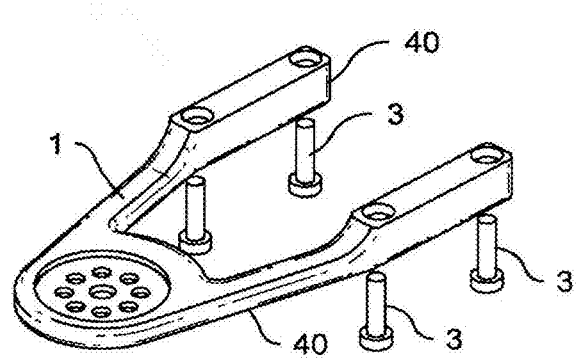
FIG. 7A is an inverted, front perspective view of a chassis and other components of a universal mounting device according to another embodiment of the present disclosure.
Figure 7B:
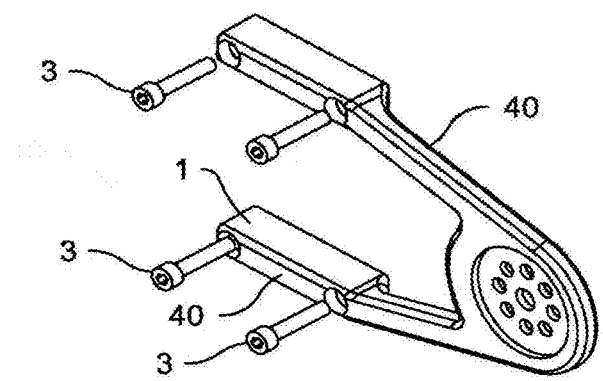
FIG. 7B is a partially exploded bottom perspective view thereof.
Figure 10:
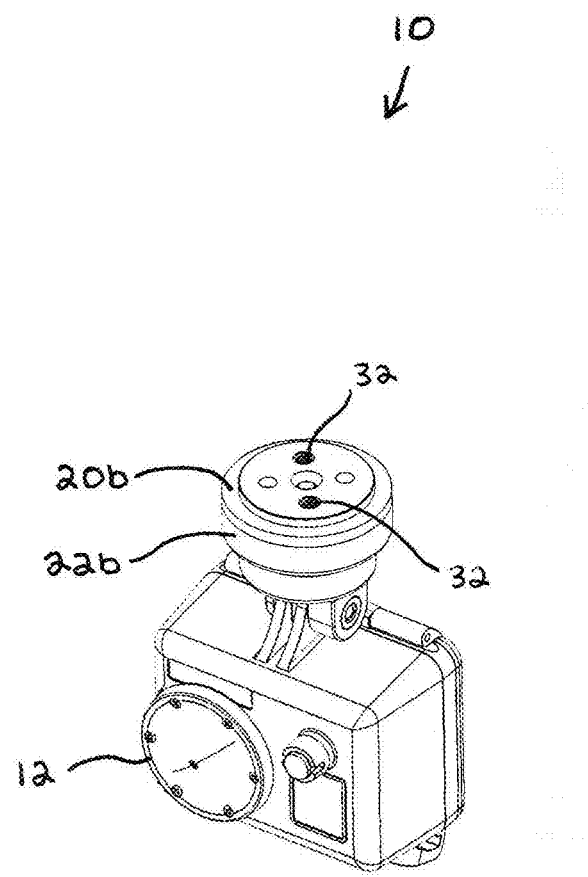
FIG. 10 is a perspective view of the device of FIG. 1, with even more features or components removed for clarity.

A distinguishing feature of the embodiment shown in FIGS. 7A and 7B is that at least a portion of the top surface of each leg 40 of the chassis 1 is flat or planar. Such a feature allows the device 10 to be quickly and easily attached to a flat surface of a location and/or object 14. For example, the device 10 could be flushly mounted beneath a horizontally-extending surface. Similar to the one of the embodiments described above, the present embodiment of the device 10 can omit the chassis cap(s) 2 such that at least one and possibly four of the mounting hardware 3 pass through the chassis 1 and into the location and/or object 14 to attach the device 10 to the location and/or the object 14.

A distinguishing feature of the embodiment shown in FIGS. 8A-8C is that the chassis 1 includes only a single leg 40. Thus, the device 10 can be single contact mount, which means that the device 10 contacts the location and/or object 14 at generally only a single point. In another embodiment, such as that shown in FIGS. 9A-9C, one or more of the attachment areas 6 have a generally square or rectangular shape. Such a configuration is beneficial when it is desirable to mount or attach the device 10 to a location and/or object 14 that has a similar cross-sectional shape.

Referring to FIGS. 1-4 and 10, the device 10 can include at least one base 20a or 20b fixedly attached to at least a portion of the accessory interface 7 of the chassis 1. In one embodiment, the device 10 includes a first base 20a and a second base 20b. In such an embodiment, a lower surface of the first base 20a can engage, contact or be fixedly attached to at least a portion of the first portion 7a of the accessory interface 7. Similarly, an upper surface of the second base 20b can engage, contact or be fixedly attached to at least a portion of the second portion 7b of the accessory interface 7.

Referring to FIGS. 1-4, 10 and 11, the device 10 can include at least one top 22a or 22b rotatably attached to at least a portion of the base 20a or 20b, respectively. In one embodiment, the device 10 includes a first top 22a and a second top 22b. In such an embodiment, a lower surface of the first top 22a can engage, contact or be rotatably attached to at least a portion of a top surface of the first base 20a. Similarly, an upper surface of the second top 22b can engage, contact or be rotatably attached to at least a portion of a bottom surface of the second base 20b.

Figure 2:
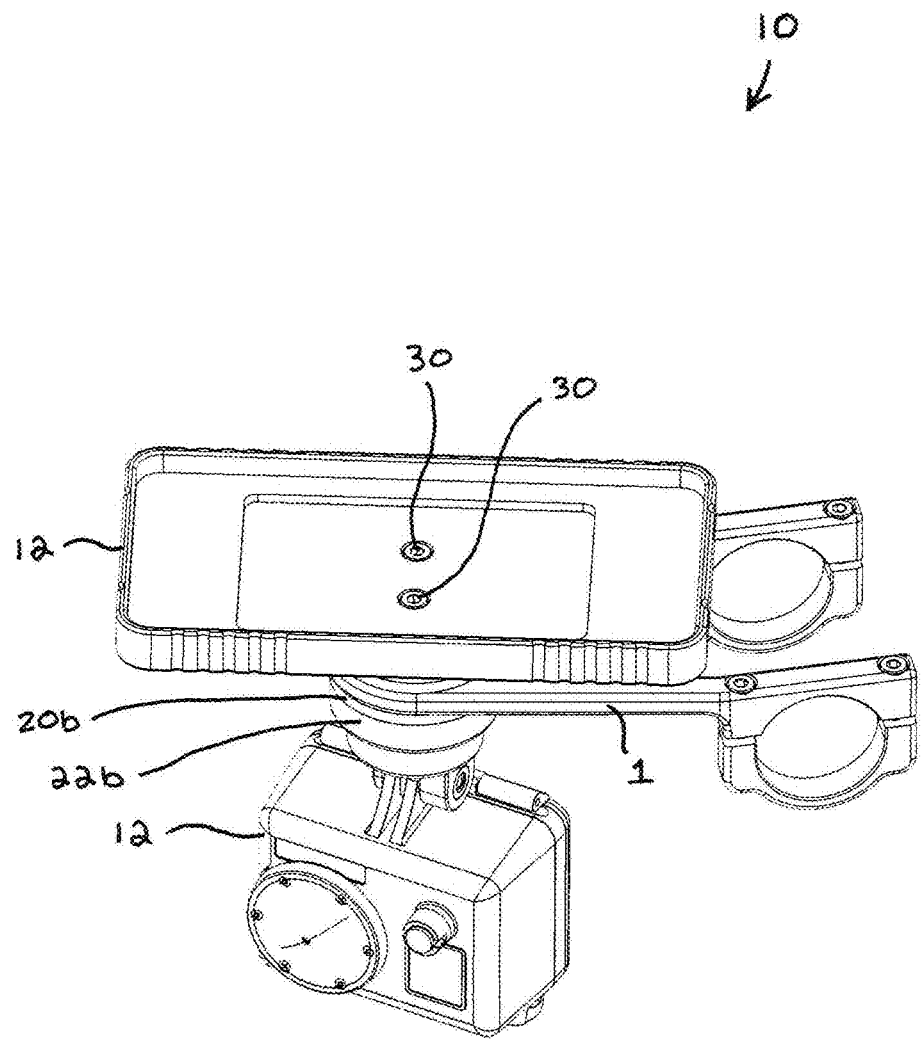
FIG. 2 is a perspective view of the device of FIG. 1, albeit with a different top accessory.
Figure 3:
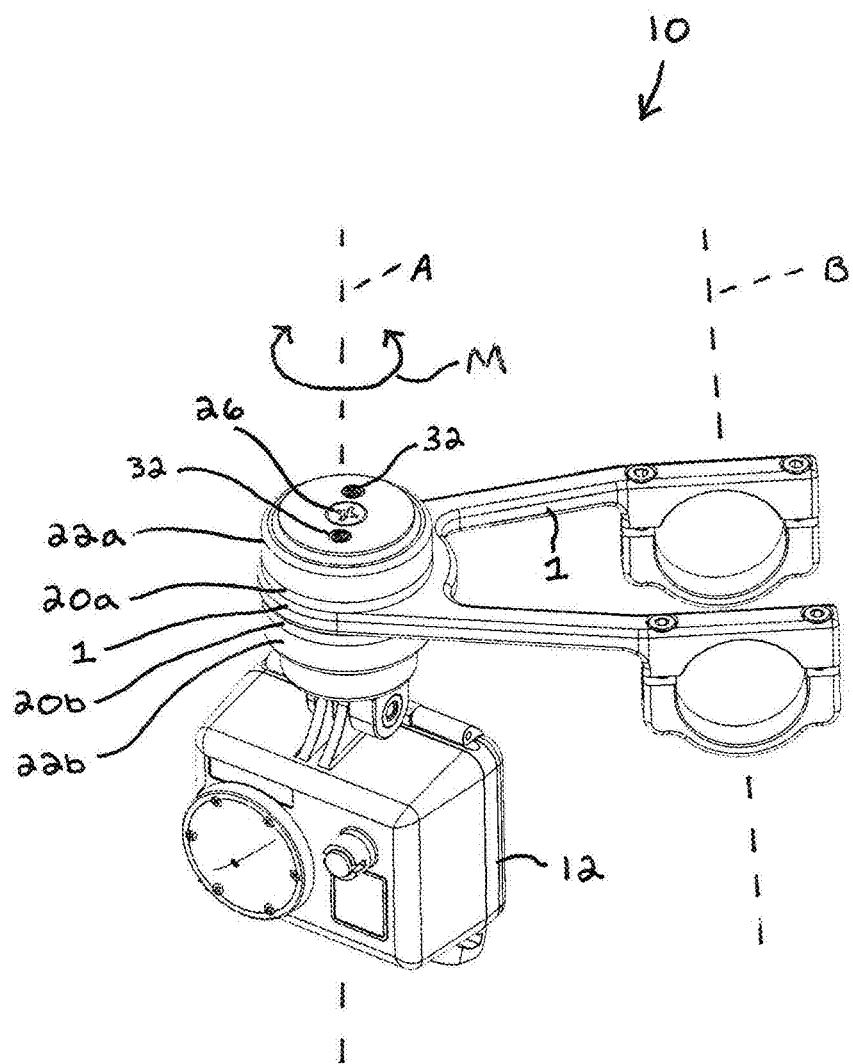
FIG. 3 is a perspective view of the device of FIG. 1, with certain features or components removed for clarity.
Figure 4:
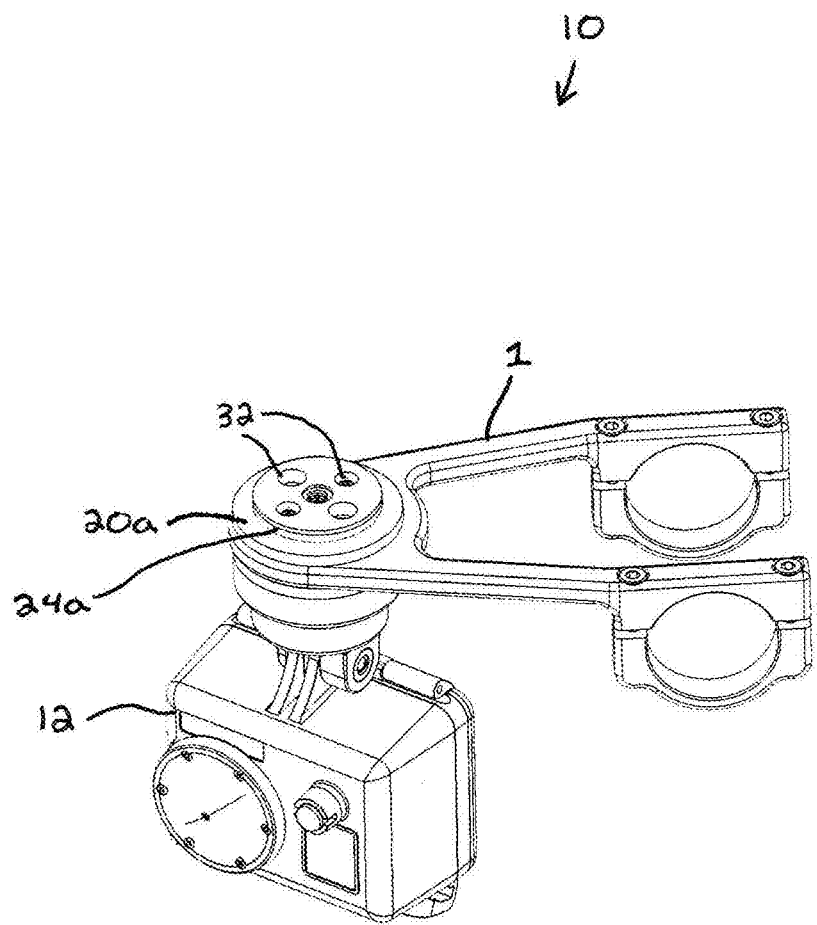
FIG. 4 is a perspective view of the device of FIG. 1, with additional features or components removed for clarity.

As shown in FIGS. 1 and 2, the device 10 can include the one or more mounting hardware or fasteners 30 to fixedly attach at least a portion of each accessory 12 to one of the first top 22a and the second top 22b. Similarly, the one or more fasteners 30 can fixedly attached the accessory interface 7 of the chassis 1 to one or both of the first base 20a and the second base 20b. As shown in FIGS. 3 and 4, each base 20a or 20b and top 22a or 22b can include one or more spaced-apart, counter-sunk, threaded holes 32 to receive at least a portion of or the entirety of one of the fasteners 30.

Figure 11:
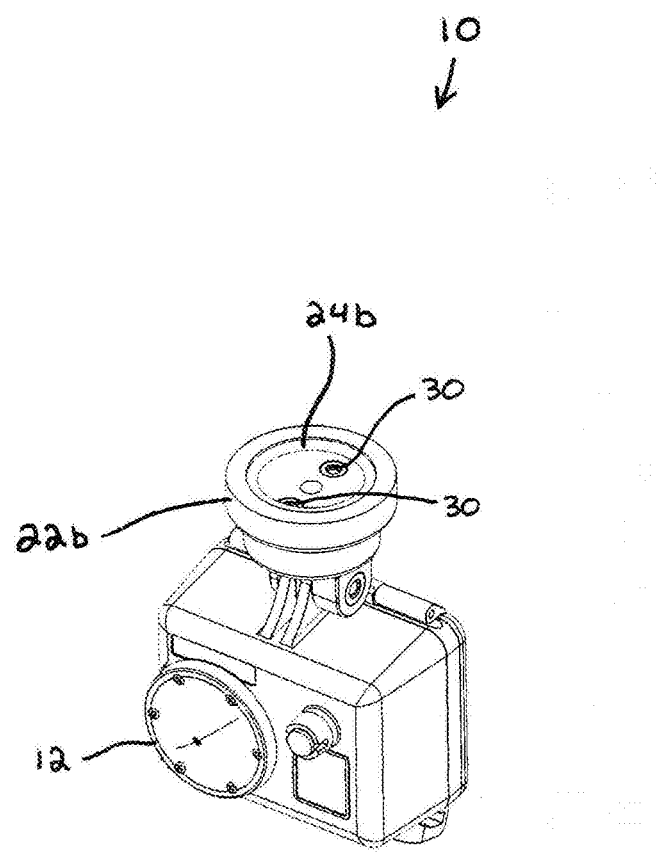
FIG. 11 is a perspective view of the device of FIG. 1, still further features or components removed for clarity.

Referring to FIGS. 4 and 11, the device 10 can include at least one gasket, such as an O-ring, positioned between the base 20a or 20b and the top 22a or 22b. In one embodiment, when the base 20a and/or 20b is properly attached to the top 22a and/or 22b, the entire O-ring can be concealed or surrounded by the base and the top 22a and/or 22b. The O-ring can be formed of a resilient, elastic or polymeric material. The O-ring can create drag between the base 20a and/or 20b and the top 22a and or 22b, and therefore the O-ring can prevent the base 20a and/or 20b from rotating freely with respect to the top 22a and/or 22b. Adjusting the compression, tension, pressure and/or thickness of the O-ring can affect the ability of the base 20a and/or 20b to rotate with respect to the top 22a and/or 22b. In one embodiment, the device 10 includes a first O-ring 24a positioned between the first base 20a and the first top 22a, and a second O-ring 24b positioned between the second base 20b and the second top 22b. At least a portion of each O-ring 24a, 24b can rest or be positioned in a groove or counter-bore in one or both of the first and second bases 20a, 20b and the first and second tops 22a, 22b.

Referring to FIG. 3, at least one fastener 26 can extend through the top 22a and/or 22b, through the base 20a and/or 20b and into at least a portion of the accessory interface 7 of the chassis 1. The fastener 26 can be configured to restrict movement of the top 22a and/or 22b, the base 20a and/or 20b and the chassis 1 along at least one axis A (e.g., "the first axis") (see FIG. 3), while simultaneously permitting clockwise or counterclockwise rotational movement M of the top 22a and/or 22b with respect to the base 20a and/or 20b. In an embodiment that utilizes the first and second bases 20a, 20b and the first and second tops 22a, 22b, at least two fasteners 26 (e.g., upper and lower) can be employed. At least some adhesives, sealants and/or surface treatment, such as Loctite®, can be applied to at least a portion of the threads of one or both of the fasteners 26.

In use, a combination of two or more of the above-described features or components permits one or more of the accessories 12 to be attached to, and rotate (e.g., spin) with respect to, the location and/or object 14, such as handlebars of a bicycle. The one or more accessories 12 can be removably clamped to the object 14, or fixedly attached thereto. One or both of the accessories 12 can be rotated three hundred sixty degrees or more about the axis A (see FIG. 3), while the entire device 10, including one or both of the accessories 12, can be rotated about and/or moved transversely along a base axis B (see FIG. 3), such as that defined by the handlebars (see FIG. 12) of the bicycle. The first axis A and the base axis B can extend generally, if not exactly, perpendicularly. It is understood that the device 10 may only support a single accessory 12. In such an instance, only the second base 20b and the second top 22b, for example, may be necessary and/or attached to the chassis 1.

FIGS. 13-20 show another embodiment of the device 110. The present embodiment is substantially similar to the embodiment described in detail above, wherein like numerals are used to identify like elements and are differentiated by a magnitude of one hundred (100). Description of certain similarities between the two embodiments may be omitted herein for the sake of brevity and convenience, but such omission is not limiting.

Figure 13:
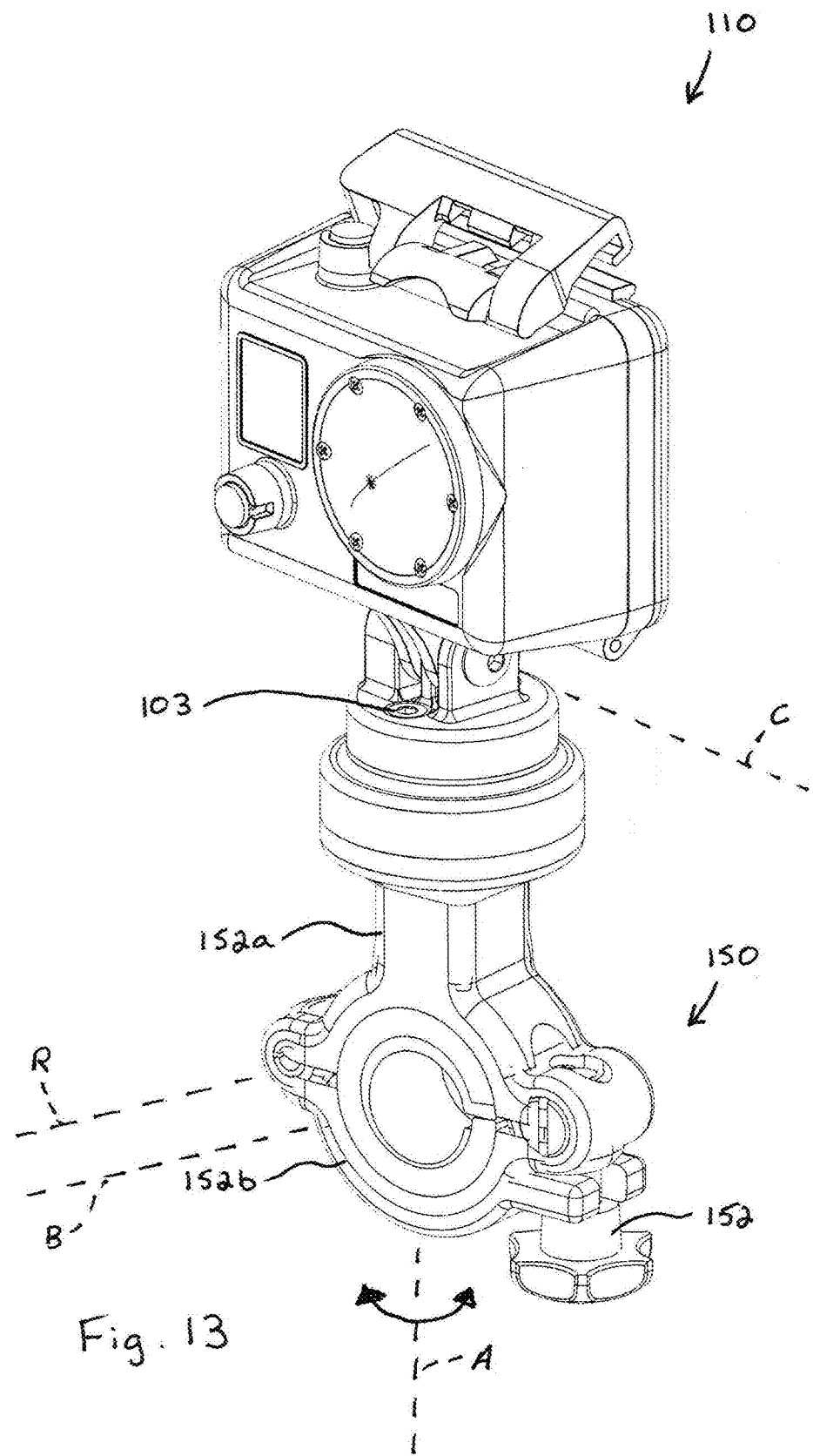
FIG. 13 is a perspective view of a universal mounting device, according to another embodiment of the present disclosure, and an accessory.
Figure 14:
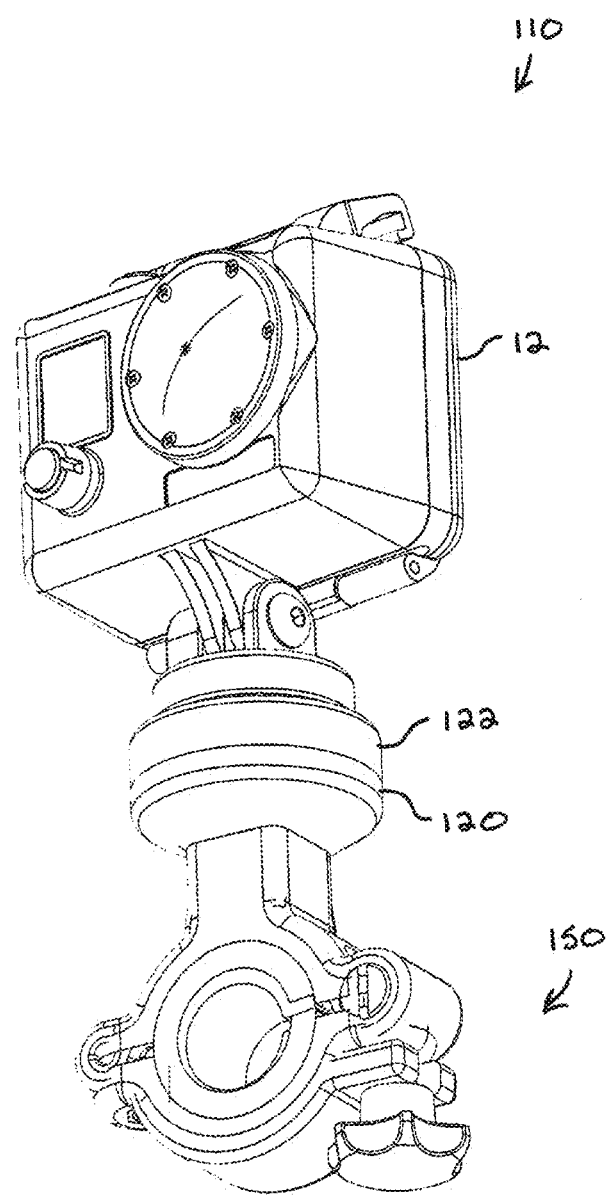
FIG. 14 is a bottom perspective view thereof.
Figure 15:
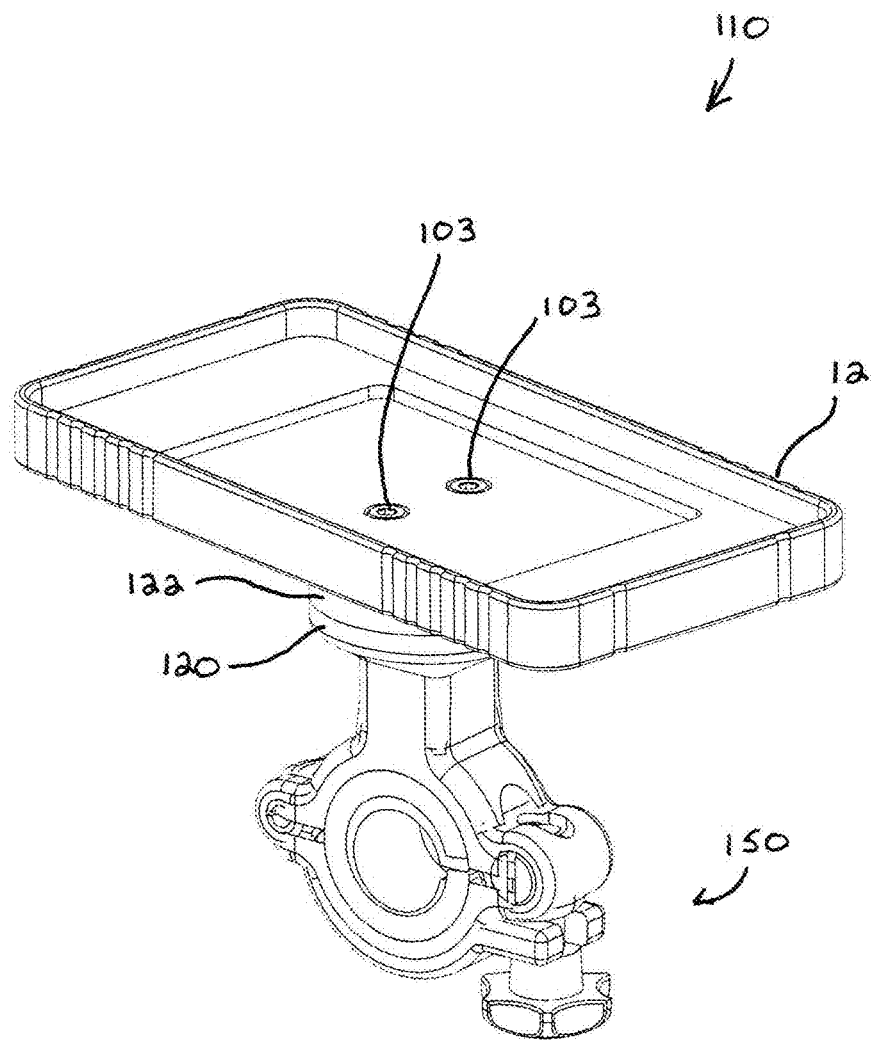
FIG. 15 is a bottom perspective view of the device shown in FIG. 13, albeit with a different accessory.
Figure 16:
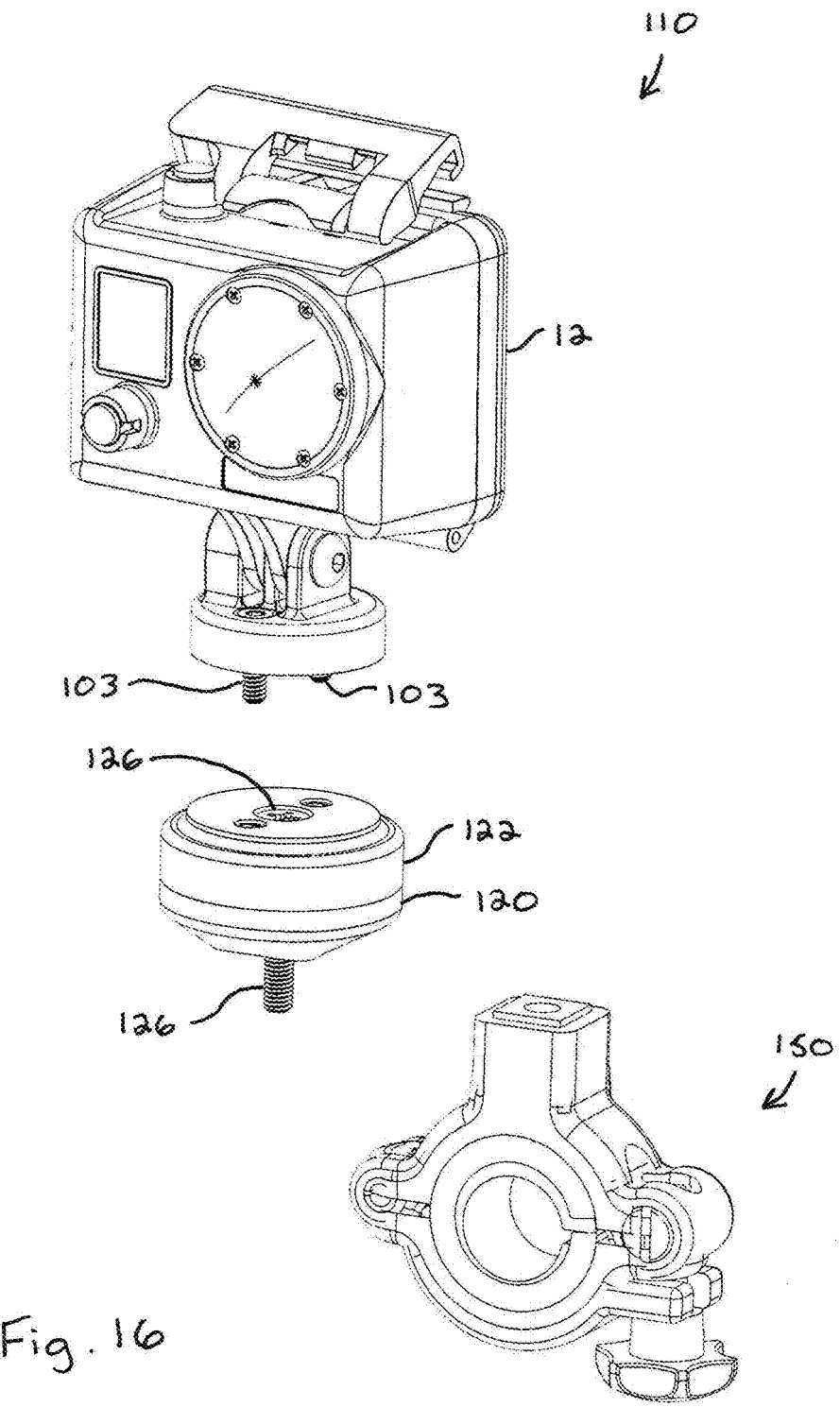
FIG. 16 is a partially exploded top perspective view of the components shown in FIG. 13.
Figure 17:
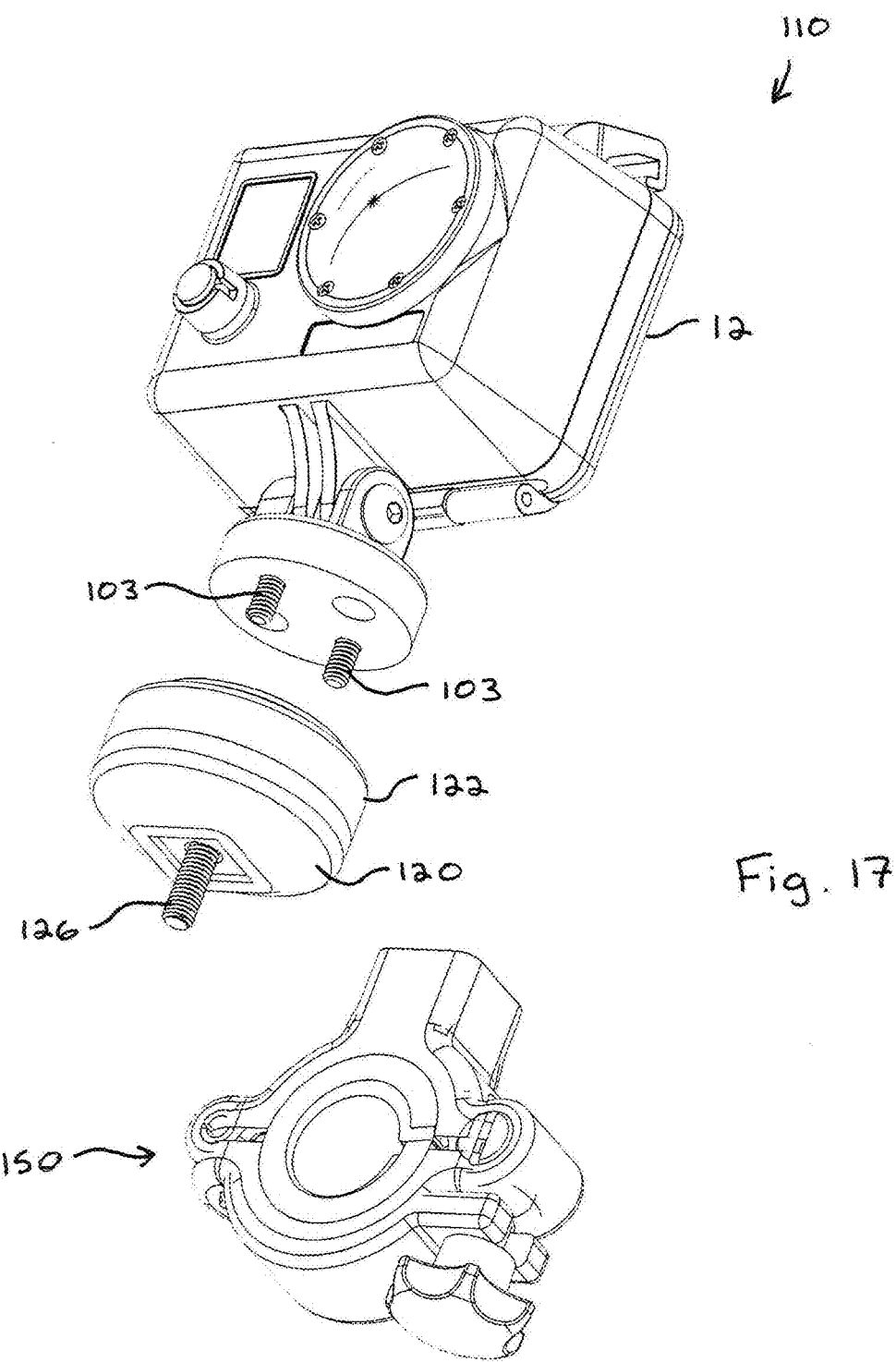
FIG. 17 is a partially exploded bottom perspective view of the components shown in FIG. 13.

In the present embodiment, the chassis 1 of the previous embodiment is essentially replaced by a mount, generally designated 150, which is configured to engage at least a portion of the object 14 (see FIG. 13). The mount 150 can include a rotatable dial or screw 152 that permits two halves or pieces 152a, 152b of the mount 150 to pivot or expand to allow at least a portion of the object 14 (e.g., handlebars of a bicycle) to be positioned therebetween. The two pieces 152a, 152b of the mount 150 can be pivotable about a rotation axis R (see FIG. 13). The rotation axis R can extend generally, if not exactly, parallel to the base axis B through which at least a portion of the object 14 (e.g., handlebars of a bicycle) can extend. The accessory 12 can include a pivot axis C, such that one portion of the accessory 12 can pivot with respect to another portion of the accessory 12 that is attached to the top 122. The pivot axis C can extend generally, if not exactly, perpendicularly to both the base axis B and the first axis A.

A first or lower end or side of a base 120 can be fixedly attached to one end of the mount 150. The base 120 can include a projection or receptacle 160 (see FIG. 19) that can engage, receive, and/or contact at least a portion of a receptacle or projection 162 (see FIGS. 18 and 20) of the mount 150, which prevents or reduces rotational movement between the base 120 and the mount 150. An opposing second or upper end or side of the base 120 can be rotatably attached to a top 122. One or more accessories 12 can be attached to the top 122 on a side or end that opposes the base 120. One or more removable mounting hardware or fasteners 103 can extend from at least a portion of the accessory to at least a portion of the top 122 to prevent or reduce relative movement between the accessory 12 and the top 122.

Figure 18:
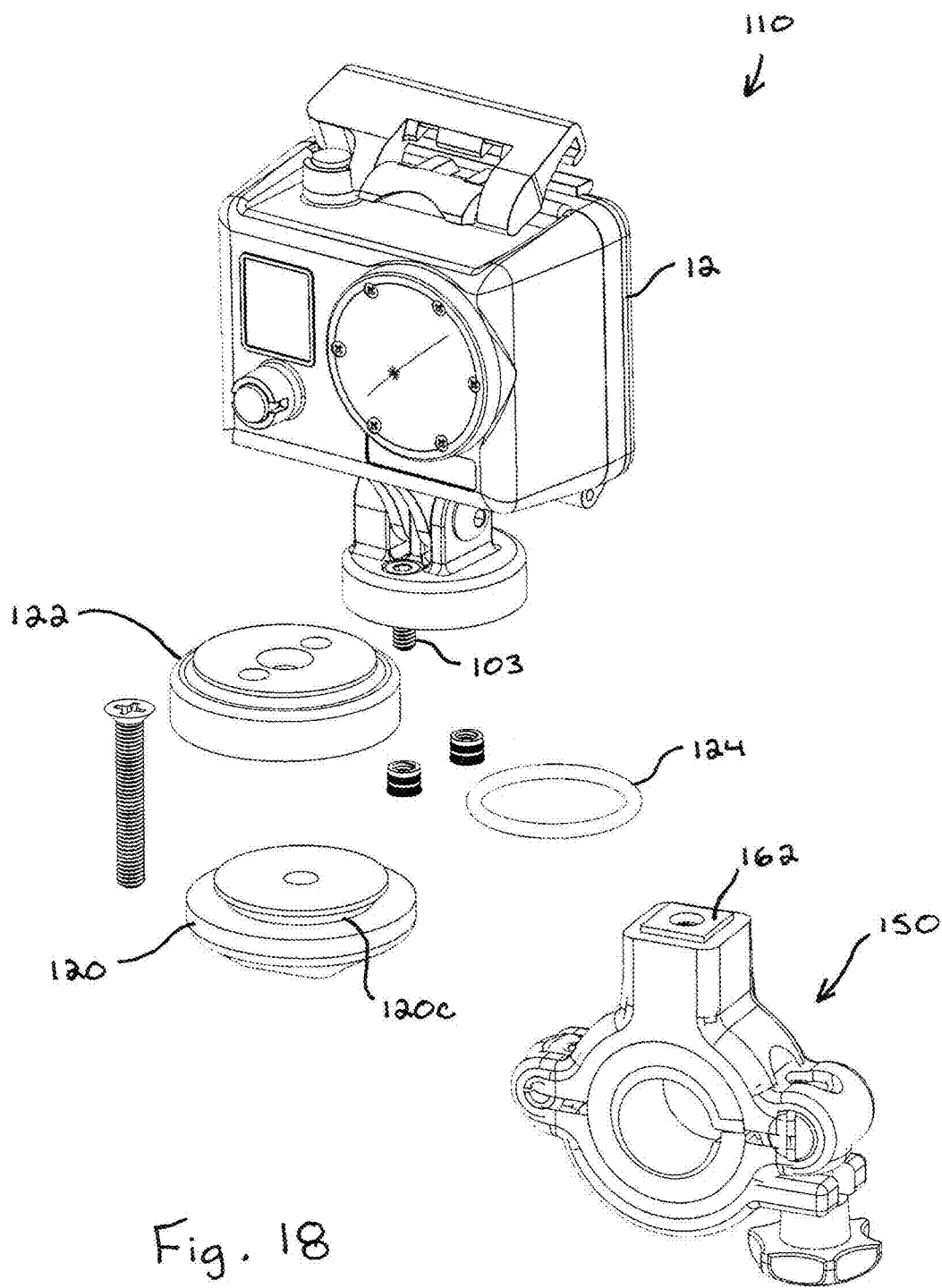
FIG. 18 is another partially exploded top perspective view of the components shown in FIG. 13.
Figure 19:
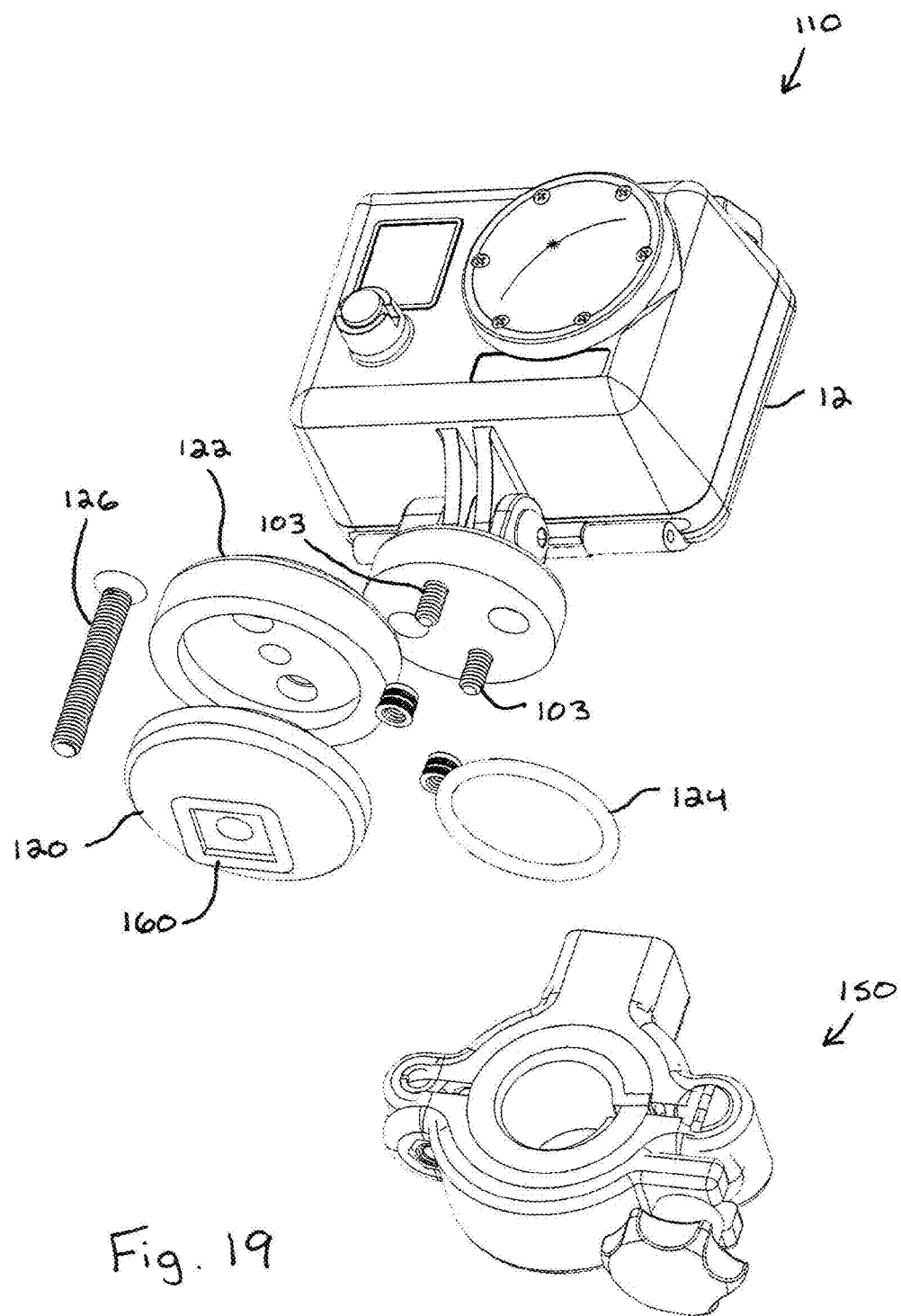
FIG. 19 is another partially exploded bottom perspective view of the components shown in FIG. 13.
Figure 20:
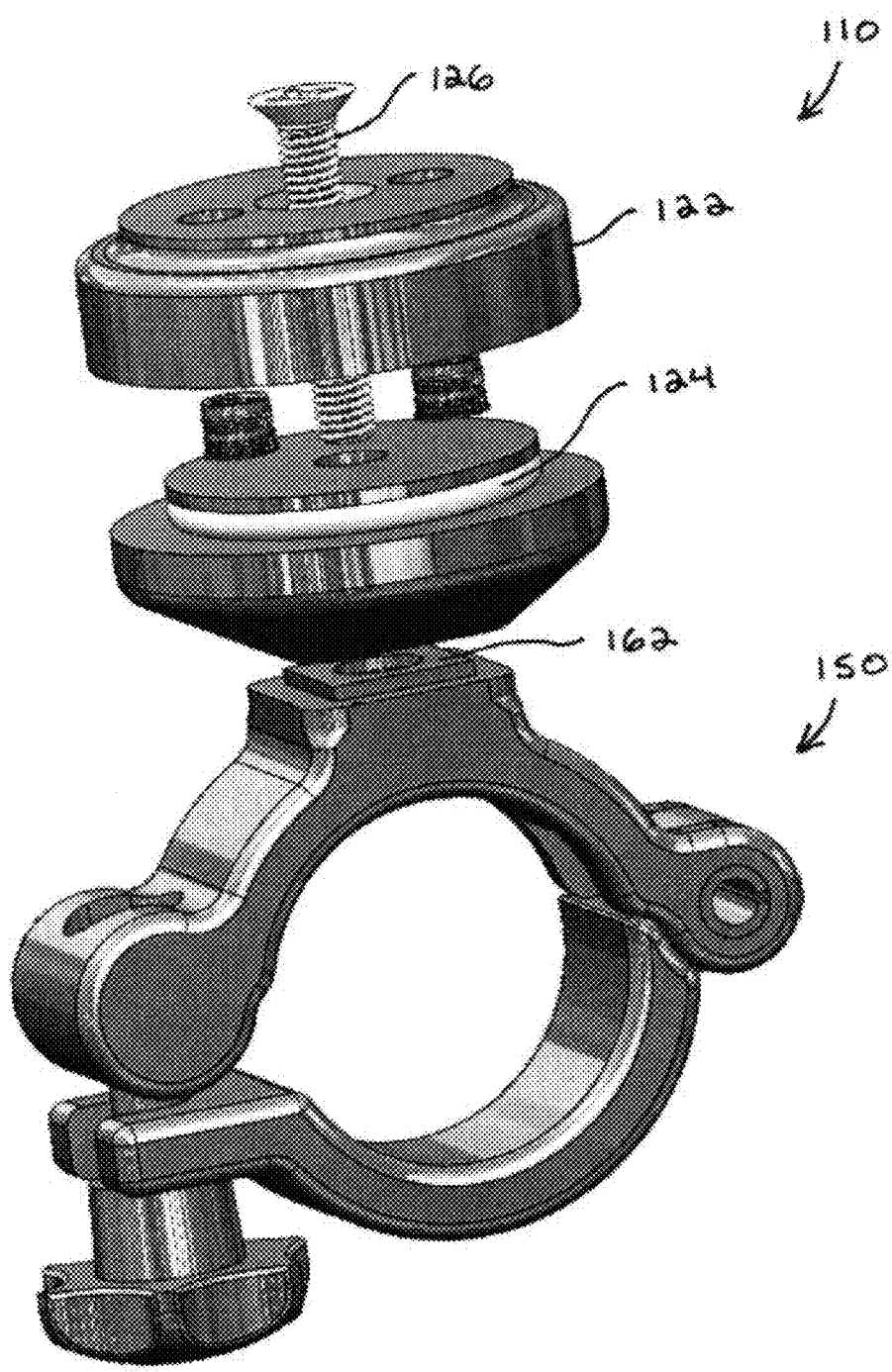
FIG. 20 is yet another partially exploded to perspective view of at least certain components shown in FIG. 13.

As shown in FIGS. 18-20, at least one gasket, such as an O-ring 124, can be positioned between the base 120 and the top 122. At least a portion of the O-ring 124 can contact an inner or lower surface of the top 122, and at least another portion of the O-ring 124 can contact an inner, upper and/or mid-portion surface of the base 120. FIG. 18 shows a groove 120c on or in the base 120 that receives at least a portion of the O-ring 124. At least a portion of the O-ring 124 can extend laterally outwardly beyond the groove 120c so as to contact at least a portion of the inner or lower surface of the top 122, thereby increasing the friction or creating drag between the top 122 and the base 120.

As shown in FIGS. 16-19, at least one fastener 126 can extend through at least a portion of the top 122, through the base 120, and into at least a portion of the mount 150. The fastener 126 can restrict movement of the top 122, the base 120 and the mount 150 along at least the axis A (see FIG. 13). As a result of a combination of two or more of the above described components, the accessory 12 is capable of rotating at least three hundred sixty degrees with respect to the mount 150 about the axis A.

In use, a combination of two or more of the above-described features or components permits one or more of the accessories 12 to be attached to, and rotate (e.g., spin) with respect to, the location and/or object 14, such as handlebars of a bicycle. The one or more accessories 12 can be removably clamped to the object 14, or fixedly attached thereto. One or both of the accessories 12 can be rotated three hundred sixty degrees or more about the first axis A (see FIG. 13). The device 110 and at least certain portions thereof permit rotation of the accessory 12, for example, about at least three separate and distinct axes, such as the first axis A, the base axis B, and the pivot axis C. Such functionality is beneficial because it provides a user with numerous options to position and/or angle the accessory 12.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A device for removably mounting at least one accessory to a vehicle, the device comprising:
    a chassis configured to engage at least a portion of the vehicle;
    at least one base fixedly attached to at least a portion of the chassis;
    at least one top rotatably attached to at least a portion of the base, at least a portion of the top being attachable to at least a portion of the at least one accessory;
    a gasket positioned between the base and the top;
    at least one first fastener extending into the top, through the base and into at least a portion of the chassis, the first fastener being configured to restrict movement of the top, the base and the chassis along at least one axis; and
    at least one second fastener extending into the accessory and into the top, the second fastener being spaced-apart from the first fastener, the second fastener being configured to restrict movement of the top and the accessory along the axis.

2. The device according to claim 1, wherein the top is configured to rotate at least three hundred sixty degrees with respect to the base about the axis.

3. The device according to claim 1, wherein the chassis includes a first end, an opposing second end, at least one leg extending therebetween, and an accessory interface located proximate the first end of the chassis.

4. The device according to claim 3, wherein the accessory interface includes a first surface and an opposing second surface, at least one of the first surface and the second surface being configured to contact or engage at least a portion of the base.

5. The device according to claim 4, wherein the at least one base includes a first base and a second base, and wherein the at least one top includes a first top and a second top.

6. The device according to claim 5, wherein the first base is fixedly attached to the first surface of the accessory interface and the second base is fixedly attached to the second surface of the interface.

7. The device according to claim 3, further comprising:
    at least one cap removably attachable to at least a portion of the leg proximate the second end of the chassis,
    wherein when the cap is attached to the leg, the leg and the cap combine to form a passageway therebetween, the passageway being configured to receive at least a portion of the vehicle therein for mounting the device to the vehicle, wherein at least a portion of the cap defines a concave surface, and, wherein at least a portion of the at least one leg defines a concave surface.

8. The device according to claim 3, wherein the at least one leg includes a first leg and a second leg, each leg extending between the first and second ends of the chassis.

9. The device according to claim 3, wherein the accessory interface includes a passageway extending therethrough, the passageway including one of a smooth interior peripheral surface and a screw thread.

10. The device according to claim 1, wherein the gasket is an O-ring configured to create drag between the base and the top, and wherein adjusting compression of the O-ring adjusts the drag.

11. The device according to claim 1, wherein at least a portion of the gasket is positioned in a groove in the base.

12. The device according to claim 1, wherein the first fastener is longer than the second fastener.

13. The device according to claim 12, wherein the first fastener extends through a geometric center of the top.

14. The device according to claim 13, further comprising:
at least one third fastener extending into the accessory and into the top, the third fastener being spaced-apart from the first fastener and the second fastener, the third fastener being the same length as the second fastener.

15. A combination comprising:
a vehicle;
at least one accessory; and
a device configured to removably mount the at least one accessory to the vehicle, the device comprising:
one of a mount and a chassis, each of the mount and the chassis being configured to engage at least a portion of the vehicle;
at least one base fixedly attached to at least a portion of one of the mount and the chassis;
at least one top rotatably attached to at least a portion of the base, the top having a first opening spaced-apart from a second opening, each of the first and second openings extending through the top, at least a portion of the top being attachable to at least a portion of the at least one accessory;
a gasket positioned between the base and the top;
at least one first fastener extending through the first opening of the top, through the base and into at least a portion of one of the mount and the chassis, the first fastener being configured to restrict movement of the top, the base and one of the mount and the chassis along at least one axis; and at least one second fastener extending into the accessory and into the second opening of the top, the second fastener being configured to restrict movement of the top and the accessory along the axis.

16. The combination of claim 15, wherein the vehicle is a bicycle having a handle bar, and wherein the accessory is selected from the group consisting of a mobile telephone, a computer tablet, an MP3 player, a camera, a flashlight, a navigation unit, a GPS unit, and a gaming unit.

17. The combination of claim 15, wherein the at least one accessory includes a first accessory and a second accessory, wherein the device further comprises a first base, a second base, a first top and a second top, at least a portion of the first top being attachable to at least a portion of the first accessory, at least a portion of the second top being attachable to at least a portion of the second accessory.

18. A device for removably mounting at least one accessory to a vehicle, the device comprising:
a mount configured to engage at least a portion of the vehicle, the mount including a first half pivotably attached to a second half, the first half and the second half combining to surround at least a portion of the vehicle;
a base fixedly attached to at least a portion of the mount;
a top rotatably attached to at least a portion of the base, the top being configured to rotate at least three hundred sixty degrees with respect to the base about at least one axis, at least a portion of the top being attachable to at least a portion of at least one accessory;
a gasket positioned between the base and the top, the gasket being an O-ring configured to create drag between the base and the top;
at least one first fastener extending into the top, through the base and into at least a portion of the mount, the first fastener being configured to restrict movement of the top, the base and one of the mount and the chassis along the axis; and
at least one second fastener extending into the accessory and into the top, the second fastener being spaced-apart from the first fastener, the second fastener being configured to restrict movement of the top and the accessory along the axis.

19. The device according to claim 18, wherein the mount includes one of a receptacle and a projection configured to engage one of a projection and receptacle of the base.

20. The device according to claim 19, wherein the mount includes a first half pivotably attached to a second half, wherein the first half and the second half combine to surround at least a portion of the vehicle.

* * * * *